United States Patent Office 3,609,781
Patented Oct. 5, 1971

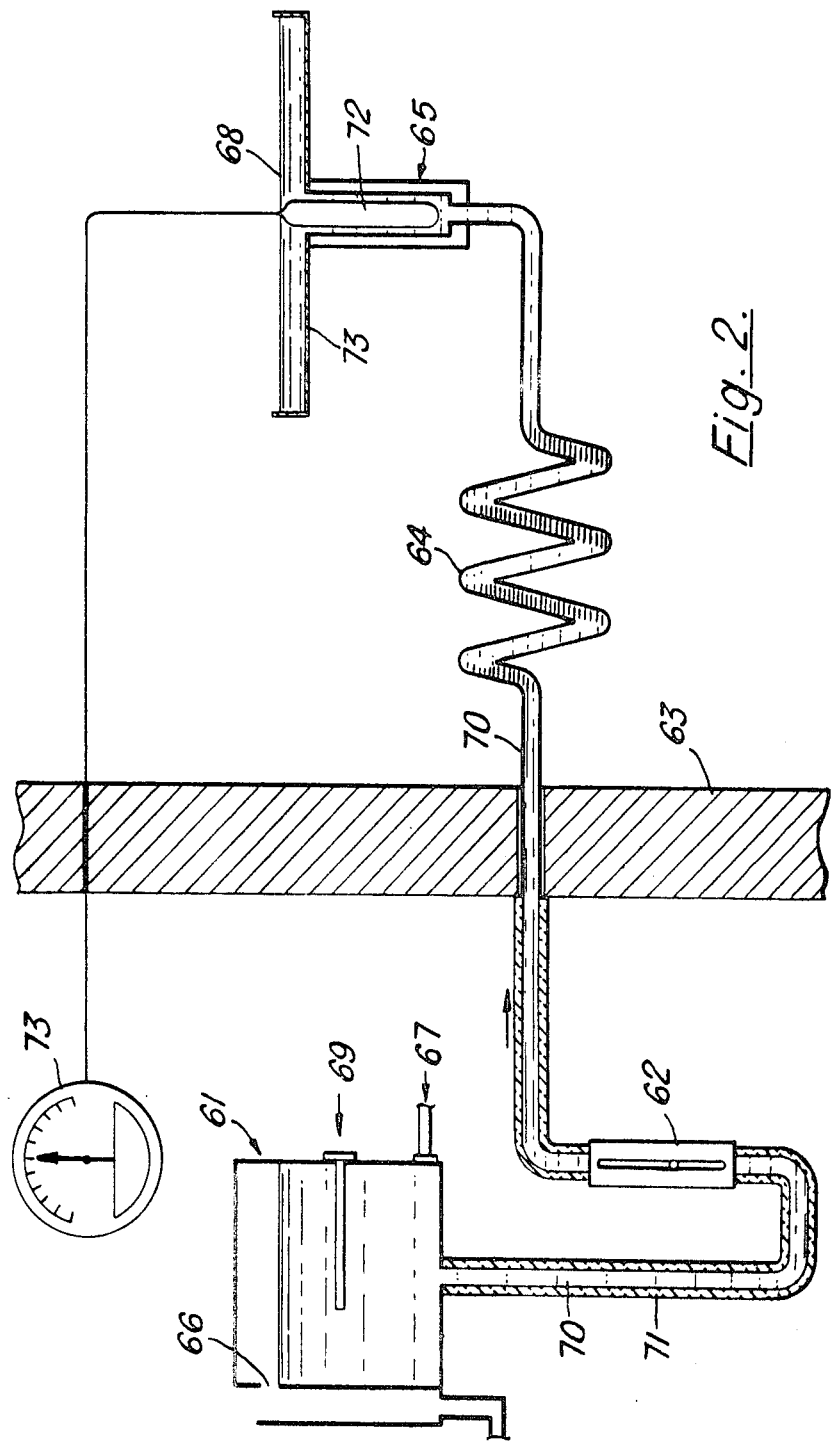

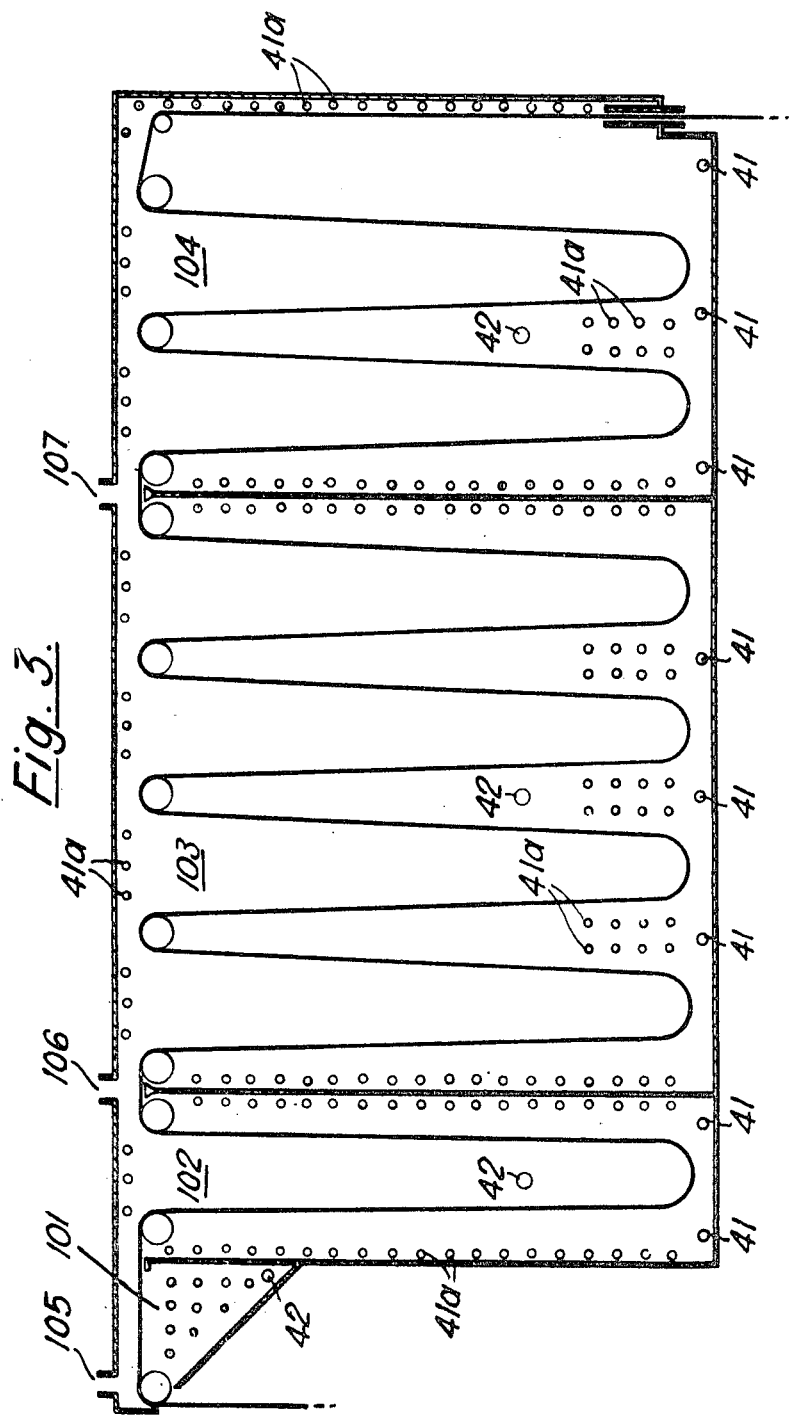

3,609,781
CURING CONDITIONS DETECTOR
Peter Dunderdale, Hale, England, assignor to The Bradford Dyers' Association Limited, Bradford, Yorkshire, England
Filed July 28, 1969, Ser. No. 845,302
Claims priority, application Great Britain, July 26, 1968, 35,868/68
Int. Cl. B08b *3/00;* D06c *1/00;* D06f *37/00*
U.S. Cl. 8—149.3         10 Claims

ABSTRACT OF THE DISCLOSURE

The curing conditions in a steaming chamber used in the curing of dyed materials are controlled by maintaining a body of liquid in the chamber in equilibrium with the conditions in the chamber, measuring the temperature of the body of liquid and the rate of evaporation from its surface, and adjusting the rate of introduction of steam and the indirect heat input to the chamber in response to the measurements obtained. Preferably the liquid will be water.

It is common procedure nowadays to manufacture carpets, pile fabrics and textiles in general in continuous lengths in a neutral colour, and then dye them by total immersion in a dye bath or by printing through a stencil. In the majority of cases the dyed lengths must then be cured, and this is generally done by passing them through a chamber into which steam is injected; the dyed material travels through the chamber, and the length of material within the chamber and the rate of travel are correlated with the conditions in the chamber so that the dyed material emerges from the chamber in a suitably cured condition. Many designs of steaming chamber are possible, and the material may travel vertically, horizontally or in festoons; in one construction, the dyed material travels through the chamber in the form of deep loops suspended from horizontal rollers at the top of the chamber.

The curing of a dyed material in a steaming chamber depends on a number of factors, among them the duration of curing, the temperature which the material reaches and the amount of water which is present on it during the curing. The atmosphere in the chamber is essentially steam, but also necessarily contains air since it is impracticable to attempt to prevent air entering the chamber with the material; the temperature of the curing and the rate of evaporation of water from the dyed material being cured clearly depend on the proportion of air in the atmosphere in the chamber, since this will effect the partial pressure of the steam in the chamber, and the effective temperature of the chamber. The proportion of air in the atmosphere in the chamber may be of the order of 10% by volume.

It has now been appreciated that the proportion of air in the chamber, and hence the curing conditions on the dyed material, may be directly correlated with measurements made on a body of liquid held within the chamber and in equilibrium with the conditions in the chamber. According to the invention, therefore, the curing conditions in a steaming chamber used in the curing of dyed materials are controlled by maintaining a body of liquid in the chamber in equilibrium with the conditions in the chamber, measuring the temperature of the body of liquid and the rate of evaporation from its surface, and adjusting the rate of introduction of steam and the indirect heat input to the chamber in response to the measurements obtained. Preferably the liquid will be water; dye liquid itself can be used for a short time to establish any difference in boiling temperature, but for continuous operation the liquid must be a pure liquid, and any liquid can be used which is of suitable volatility and which is not precluded by virtue of any other undesirable property.

The invention will now be described with reference to the accompanying drawings. In these drawings, FIG. 1 shows diagrammatically a plant in which carpet in continuous lengths is printed, and then steamed to cure the dye. In the plant shown, the carpet is being dyed by total immersion in a dye bath, so that a single coloured product is obtained; the total immersion dyebath could be replaced by a number of printing stations if carpet having a multi-coloured pattern was required.

FIG. 2 shows in greater detail the apparatus for ascertaining the conditions in the steaming chamber of FIG. 1.

FIG. 3 shows in greater detail one special form of steamer, a three-zone steamer which can be used to simulate winch batch curing conditions on a continuous process. The steamer of FIG. 3 can be incorporated between the lines A—A and B—B of FIG. 1.

Figure 1:
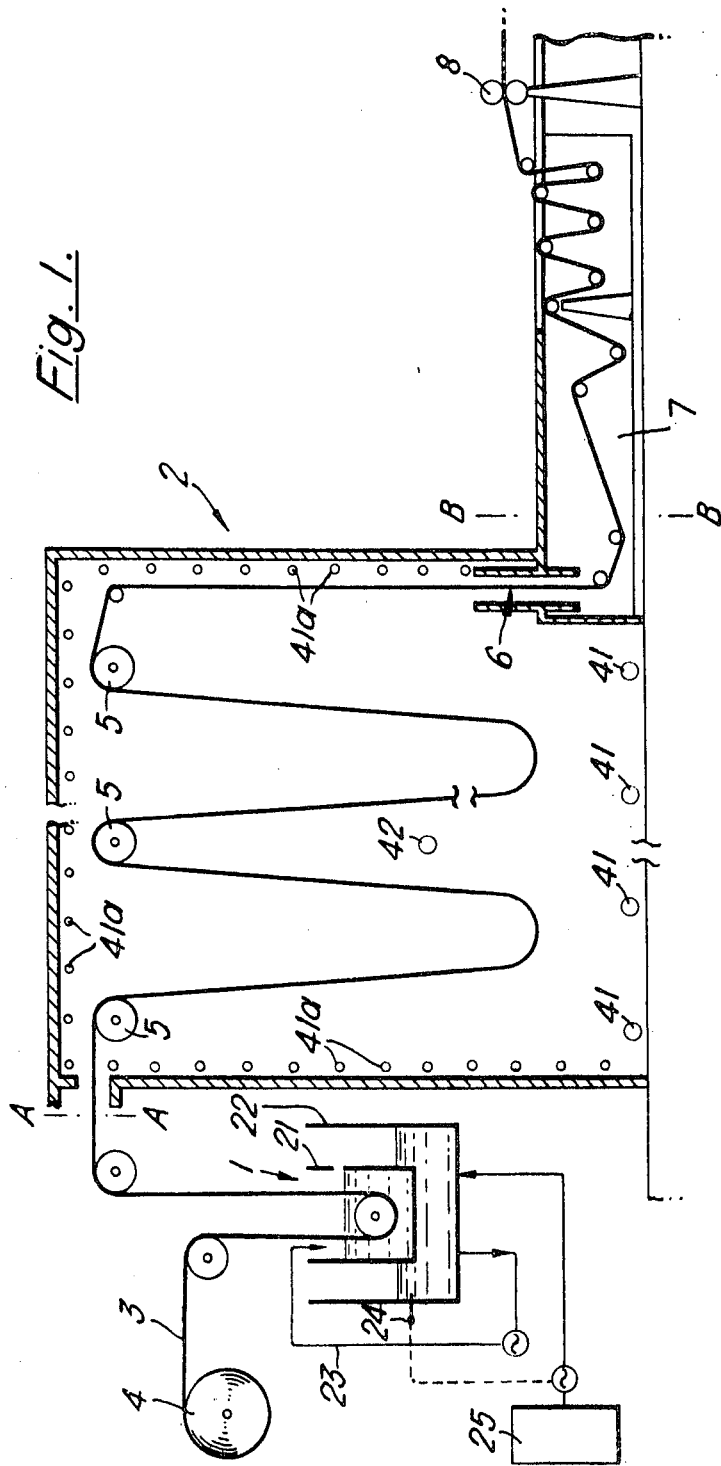

In FIG. 1, a total immersion dyebath is shown generally as 1 and a steaming chamber, which may be for example 20 feet wide, 20 feet high and 40 feet long, is shown generally as 2. A continuous length of carpet 3, drawn from a roll 4, passes through the dye bath at a rate which may be between 3 and 8 yards per minute, for example so as to give 300 square yards per hour, and then into the steaming chamber; in the steaming chamber the carpet travels in a series of deep loops extending from driven horizontal rollers close to the top of the chamber. This formation of loops is necessary in order that a large quantity of carpet may be held within the steaming chamber for the desired time without making the chamber unduly large. The carpet leaves the chamber through an outlet 6, passes through a washing bath 7 and then through the nip between withdrawal rolls 8.

The dyebath 1 consists of inner and outer tanks 21 and 22 interconnected by an overflow system from one to the other, and a recirculating arrangement 23. The level of dye liquid in the outer tank is sensed by a probe 24, and signals from this probe are used to control the supply of make-up liquid from a tank 25. The dye consumption is of course related to the weight of the carpet, and may be up to 750 gallons per hour for heavy carpet.

From the dye bath, the carpet passes into the steaming chamber 2. There are a number of driven rollers 5, for example up to 11, so that there are a corresponding number of deep loops. Steam is introduced into the chamber at a number of points, indicated at 41, in the longitudinal wall of the chamber near the floor, further heating is provided by a number of transverse heating coils 41a, and an apparatus according to the invention for ascertaining the conditions inside the chamber is mounted also in the longitudinal wall of the chamber, at a position indicated at 42.

Referring now to FIG. 2, the apparatus according to the invention, mounted at 42 in the chamber, consists essentially of a header tank 61 (which may be 6 inches square and 8 inches deep) and a flow meter 62 outside the steaming chamber (the longitudinal wall of which is indicated at 63), and a heat exchanger 64 and an open-topped vessel 65 (which may be ¼ inch deep and 2 square feet in area) inside the steaming chamber. Clearly the dimensions of the header tank, the open-topped vessel and the heat exchanger will be correlated both among themselves, and with the dimensions of the flow meter; with such dimensions as those given for the header tank and open-topped vessel, the heat exchanger could be of ¼ inch outside diameter copper pipe such as to have a surface area of about 1 square foot, and the flow meter could be calibrated up to 1.2 pounds per hour. The header tank 61 is fitted with a weir and overflow 66 so that a constant level is maintained in it (fresh water being supplied at 67), and the open-topped vessel 65 is at the same height so that a constant level 68 is maintained in it also. A thermostat 69 in the header tank keeps the contents at a fixed temperature, and the pipe 70 linking the header and the flowmeter 62 and as far as the wall of the chamber is lagged (as at 71).

Inside the steaming chamber, the pipe 70 is coiled to form the heat exchanger 64 and then enters the bottom of the open-topped vessel 65; the lower part of the vessel is narrow, and accommodates a thermometer 72, and the upper part is widened out forming a shallow dish 73 of large surface area. Leads from the thermometer 72 are taken to a suitably calibrated meter 73.

When the steaming chamber is in operation, the contents of the vessel 65 quickly attain equilibrium with the atmosphere in the chamber, and evaporation takes place into the chamber from the surface of the water in the dish 73. The level 68 is maintained from the header tank 61, and this means that water flows along the pipe 70 through the flowmeter 62 to replenish the vessel 65. Measurements are taken of the temperature indicated by the thermometer 72, and the flow indicated by the flowmeter 62.

The temperature indicated is the temperature, or at least very close to the temperature, which is attained by the dyed material in the chamber, and the flow indicated gives a measure of the rate of evaporation of water from the dyed material. The optimum values of these parameters for successful curing can readily be obtained from simple experiments; a fall observed in either or both of them from the optimum values indicates the need of an increase in the rate of injection of steam into the chamber, and vice versa.

Provided that the temperature of the water entering the chamber remains constant, the actual value is not critical, since the water will be heated up to equilibrium temperature on passing through the heat-exchanger and on entering the vessel 65; in fact the width of the dish 73 can be related to the efficiency of the heat exchanger, and if the heat exchanger is long enough a dish-shaped portion may not be required at all.

The apparatus according to the invention is designed to indicate the conditions in the steamer, and to provide parameters by which these conditions can be controlled. In practice it is found that a readily observable change in the parameters does not result in a significant change in the quality of the product for some quite appreciable time; hence a simple alarm signal is all that is required to alert an operator, who can then take appropriate action to restore the desired conditions in the chamber.

FIG. 3 shows a three-zone steamer, split into the three zones corresponding to the stages of dye fixation, that is dye strike, dye dispersion, and fixing and cooling. Optimum conditions for each of these stages can be arranged in each zone.

The steamer is made up of a pre-heat compartment 101, and three compartments 102, 103 and 104, divided by partitions. In each of these compartments steam is injected at points 41, subsidiary heating is provided by coils 41a, and a detector device is mounted at 42. Vents 105, 106 and 107 are located in the top of the steamer.

The essential features of an apparatus for carrying out the invention are therefore means for maintaining a body of liquid in a steaming chamber in equilibrium with the conditions in the chamber, means for measuring the temperature of the body of liquid, means for supplying replenishment liquid at constant temperature to the body to replace liquid lost from it by evaporation, and means for measuring the rate at which the replenishment liquid must be supplied to maintain the body of liquid.

I claim:

1. A process for the control of the curing conditions in a steaming chamber used in the curing of dyed material, comprising the steps of maintaining a body of liquid in an open receptacle in the steaming chamber in equilibrium with the conditions in the chamber, maintaining a predetermined quantity of liquid in the receptacle by supplying liquid at a substantially constant temperature from a liquid supply means connected to the receptacle at a rate sufficient to compensate for liquid lost from the receptacle by evaporation in the steaming chamber, heating the liquid from the liquid supply means by passing it through the steaming chamber prior to its entry into the receptacle, measuring the temperature of the liquid in the receptacle as an indication of the temperature of the dyed material, measuring the flow of liquid from the liquid supply means to the receptacle as a measure of the rate of evaporation of water from the dyed material, and adjusting the condition in the steaming chamber in response to the measurements of the temperature of the liquid in the receptacle and the flow of liquid from the liquid supply means to the receptacle.

2. The process of claim 1 wherein the liquid is water.

3. The process of claim 1 wherein liquid is supplied to the receptacle from a header tank disposed outside of the steaming chamber, the liquid in said header tank being maintained at a substantially constant level corresponding to the desired level of liquid in the receptacle.

4. The process of claim 1 wherein the liquid from the liquid supply means is heated by passing it through a heat exchanger in the steaming chamber prior to its entry into the receptacle.

5. The process of claim 1 wherein the temperature of the liquid in the receptacle is measured by a thermometer disposed in the receptacle and connected to a temperature indicating means disposed outside of the steaming chamber.

6. The process of claim 1 wherein the flow of liquid from the liquid supply means to the receptacle is measured by a flow meter disposed between the supply means and the receptacle and outside of the steaming chamber.

7. Apparatus for the control of the curing conditions in a steaming chamber used in the curing of dyed material, comprising an open receptacle disposed in the steaming chamber and containing a body of liquid, liquid supply means disposed outside the steaming chamber, a liquid supply line extending from said supply means to said receptacle, said supply means maintaining a predetermined quantity of liquid in said receptacle by supplying liquid to said receptacle through said supply line at a rate sufficient to compensate for liquid lost from said receptable by evaporation in the steaming chamber, means in the steaming chamber for effecting heating of the liquid in said supply line prior to its entry into said receptacle, means in said receptacle for measuring the temperature of the liquid therein as an indication of the temperature of the dyed material within the steaming chamber, and means connected to said supply line for measuring the flow of liquid from the liquid supply means to said receptacle as a measure of the rate of evaporation of water from the dyed material.

8. The apparatus of claim 7 wherein said liquid supply means comprises a header tank having means for maintaining liquid therein at a substantially constant temperature and at a substantially constant level corresponding to the desired level of liquid in said receptacle.

9. The apparatus of claim 7 wherein said heating means comprises a heat exchanger connected to said supply line.

10. The apparatus of claim 7 wherein said flow measuring means comprises a flow meter.

References Cited
UNITED STATES PATENTS

| | | | |
|---|---|---|---|
| 1,942,934 | 1/1934 | Reeve | 73—29 |
| 2,089,920 | 8/1937 | Aubauer | 8—149.3X |
| 2,350,021 | 5/1944 | Dunn | 8—149.3X |
| 3,265,301 | 8/1966 | Amdur et al. | 73—29X |
| 3,318,302 | 5/1967 | Adams | 73—29X |

PAUL R. GILLIAM, Primary Examiner

U.S. Cl. X.R.

68—5D